Jan. 29, 1935.  L. C. TINGLEY  1,989,298
FEEDING DEVICE
Filed May 20, 1933
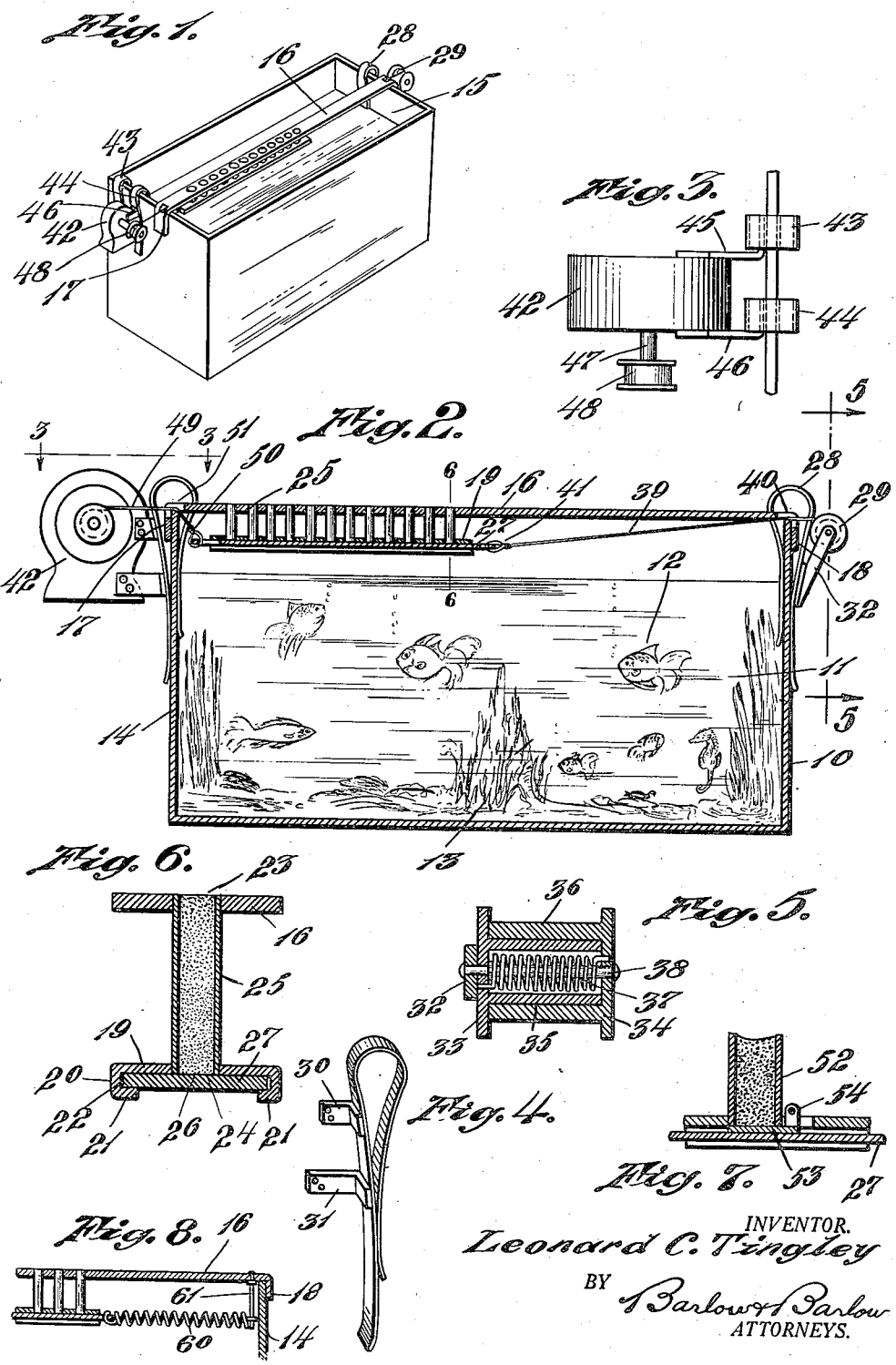
INVENTOR.
Leonard C. Tingley
BY Barlow & Barlow
ATTORNEYS.

Patented Jan. 29, 1935

1,989,298

UNITED STATES PATENT OFFICE 1,989,298

FEEDING DEVICE

Leonard C. Tingley, Providence, R. I.

Application May 20, 1933, Serial No. 672,009

8 Claims. (Cl. 119—51)

This invention relates to a device for mechanically feeding captive fish or other animals; and has for its object to provide a means by which food may be stored and made available for consumption in the desired quantities and at the desired times over a period of several days.

Another object of this invention is the provision of a construction which is so arranged that it may be removably mounted upon tanks or aquariums now in general use without the necessity of having a specially constructed tank or aquarium.

Another object of the invention is the provision of a construction which may be adapted for use on various sizes of aquariums by a simple manipulation or bending of the parts.

A further object of the invention is the provision of a construction which will be simple and economical to manufacture and yet one which will be positive and effective in its operation.

With these and other objects in view, the invention consists of certain novel features of construction, as will be more fully described, and particularly pointed out in the appended claims.

In the accompanying drawing:

Fig. 1 is a perspective view of a tank or aquarium with my improved feeding device mounted thereon.

Fig. 2 is a sectional view thru the feeding device and aquarium.

Fig. 3 is a top plan view of the motor device and clips for mounting the same.

Fig. 4 is a perspective view of one of the clips which are used for mounting the mechanism in position.

Fig. 5 is a vertical sectional view taken on a plane defined by the line 5—5 of Fig. 2.

Fig. 6 is a section on line 6—6 of Fig. 2.

Fig. 7 is a sectional view similar to Fig. 2 of a detail and showing a modified construction.

Fig. 8 is a fragmental sectional view of a modified form of construction.

Many people keep fish and other animals in captivity, which must be fed daily or at frequent intervals which requires frequent attention. Often, these persons who perform these periodic feedings wish a holiday or would like some device which would relieve them to some extent of so frequently performing these feeding acts and which will operate mechanically and automatically at periodic intervals without being dependent upon the human element of memory, and in order that this may be accomplished in a positive and mechanical manner whereby foood may be discharged into a tank or aquarium at periodic intervals, I have provided a mechanism which may be mounted upon a tank and which will discharge food daily or twice a day or at different periodic intervals without requiring a person's attention for over an extended period of time if desired, and I have so arranged this device that it may be readily mounted upon and attached to most any of the usual tanks or aquariums by clips or the like, and operated by the use of a clock or suitable motivating device which may be actuated electrically or by a spring if desired, over such extended period of time as the capacity for which it is built; and the following is a detailed description of the present embodiment of this invention illustrating the preferred means by which these advantageous results may be accomplished:—

With reference to the drawing, 10 designates a tank containing water 11, fish 12 and the other pertinent parts of an aquarium, such as ornaments or grass 13. This tank which I have illustrated may be one of any of the conventional tanks or aquariums and in this particular instance consists of side walls 14 open at the top 15 across which usually some cover may rest to keep the fish from jumping out of the tank.

My mechanical feeding device is readily detachable from the tank and consists of a supporting strip or plate 16 which is bent as at 17 at one end and at 18 at the other end to extend over the diametrically opposite edges of the tank. This strip 16 is of sufficient rigidity to support the parts which it carries but the same is of sufficient flexibility to permit it to be bent at the desired point over the edge of the tank so that it may be adjustably attachable to tanks of varrying lengths and widths as occasion may require and may be laterally adjustable therealong. A second plate 19 is positioned below the supporting plate 16. The longitudinally-extending edges of this plate 19 are rolled downwardly and inwardly as at 20 to provide lips 21 forming a slideway 22 between the lips and the bottom of the plate for a closure controlling slide to be presently described.

The plates 16 and 19 are provided with aligned openings 23 and 24 receiving the tubes 25 which are secured therein and serve to support the bottom plate from the top plate and also provide pockets or compartments in which the feeding material may be deposited. Each pocket or compartment may be discharged thru its lower open end 26 by the material dropping therethru by gravity. These discharge openings are closed by a slide 27 of a width to extend between the opposite downwardly extending portions of the plate 19 and of a thickness to engage the lower surface of the plate 19 when supported by the lips 21.

The slide 27 extends the entire length of the discharge pockets and closes all of them, they may, however, be opened by pulling the slide out from beneath one pocket at a time so that the contents thereof may be discharged into the tank. The pockets which I have provided are all in a straight line and equally spaced apart altho various other arrangements may be provided if so desired.

Operating means for the slide are also suitably adjustably mounted in position such as by a clip 28 adjustably supported on one end of the tank, which clip carries a pulling device 29, the same being mounted upon these clips by means of brackets 30 and 31 and a supporting arm 32. This pulling device may be a weight, altho in this particular instance it consists of a spool having heads 33, 34 with telescoping body portions 35 and 36, which are relatively rotated by a spring 37 engaging these heads and operating about an axle pin 38. Secured to this spool to be wrapped thereabout is a flexible element 39 which extends thru an opening 40 in the supporting plate 16 and is attached as at 41 to one end of the slide 27 so that the pulling device will move the slide longitudinally to cause it to serially uncover the discharge openings of the pockets to permit discharge of the contents thereof.

In order that this movement may be controlled to operate at periodic intervals, I complete the operating means by use of some suitable device for this purpose, which consists of a clock or an electric motor with time control, the details of which are not a part of my invention, the same being known as a Telechron movement. This device 42 is adjustably supported upon the tank by a pair of clips 43, 44 thru brackets 45, 46 and is provided with a shaft 47 having a pulley 48 thereon. Secured to the pulley and extending about the same is a flexible element 49 which is secured at 50 to the end of the slide 27 by extending thru an opening 51.

The clock device 42 such for instance as that shown in Patent No. 963,041 is so constructed that at periodic intervals, say for instance each 12 or 24 hours, it will cause the movement of the pulley 48 a certain definite amount so that the pulley will let off a certain definite length of the flexible element 49, the amount of let off being adjustable and being so arranged that it will be substantially the distance between two of the pockets or compartments 25 and as this let off occurs the pulling device will move the slide so that periodically ever so often depending upon the setting of the Telechron clock the slide will move an amount sufficient to uncover one of the discharge openings or pockets. Upon the next operation in the same manner the slide will then remove the bottom of the next pocket which may be a certain desired number of hours afterwards and so on until the bottom is removed from each of the pockets. The particular clock which I have illustrated is designed to be attached to a house current for operation altho a spring may be contained therein for actuating the movement, if desired. The clock is preferably of a type so that should the house current cease, the clock will start again when the current comes on or there may be an auxiliary spring used which will be wound by the movement and come into play to operate during the length of time the house current is off.

I also conceive that many other mechanical means may be used, one particular instance being that shown in Fig. 7, wherein the pocket 52 is closed by a gate 53 hinged at 54 and held closed by the slide 27 extending therebeneath. As the slide is withdrawn it will permit the gate 53 to swing downwardly and the contents of the pocket to drop by gravity into the tank.

The mechanical device which I have shown is readily attachable to or detachable from the tank and the cover over the tank may be positioned as before as the supporting device 16 is of thin material.

In Fig. 8, I have illustrated a modified form of pulling device, the same consisting of a helical spring 60 secured to the end of the slide 27 and supported on the plate 16 by a suitable post 61, the same being placed under tension upon closing the slide and then serving to move the slide to open the pockets as the clock device operates.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination, a tank having side walls and an open top, clips attached to said side walls, a feeding unit supported by said walls and extending over said open top, and operating means for said feeding means supported on said clips.

2. In a mechanical discharging device, a plurality of horizontally aligned spaced apart pockets each having a discharge opening independent of the others, means including a horizontally movable slide for controlling said discharge openings, and means for intermittently moving said slide in steps corresponding substantially to the distance between the centers of said pockets to serially remove the closure means from the discharge openings of said pockets.

3. In combination, a series of compartments, vertically spaced plates, one at either end of said compartments, each compartment having a discharge opening thru the lower plate, the edges of said lower plate being rolled downwardly and inwardly to provide a guideway, and means including a slide in said guideway for closing said openings, said slide being relatively movable beyond each of said openings to permit discharge of the material in the compartment thru said openings.

4. In combinations, a strip of material, compartments provided thereon, said material being sufficiently rigid to extend between spaced supporting edges of a tank or the like and yet sufficiently pliable to be deformed over the edges of a tank or the like to secure the same in position, and means for controlling the discharge of said compartments.

5. In combination, spaced plates, compartments formed between said plates, one of said plates being formed of deformable material bendable over the edges of a tank to secure the same in place, and means for controlling the discharge of said compartments.

6. In a combination with a feeding device, means for supporting said device on the top of an aquarium, comprising a portion of a strip of material for extending over spaced portions of the top edge of the aquarium and folded at a sharp angle to engage the outer surface of the upright portion thereof and prevent the longitudinal movement of said device.

7. In combination with a feeding device, means for supporting said device on the top of an aquarium, comprising portions of strip material extending in opposite directions for engaging the top edge of the aquarium and folded at a sharp angle to engage the outer surface of the upright portion thereof and prevent longitudinal motion of said device.

8. In combination, a tank having side walls, a detachable feeding means including means extending across said tank for supporting the same and a plurality of aligned pockets, a plurality of operating means, adjustable means for attaching at least one of said operating means to at least one side wall of said tank, said feeding means including a slide movable with reference to said supporting means from under one of the aligned pockets at a time to successively discharge the contents of the pockets into said tank, and means connecting the operating means and slide.

LEONARD C. TINGLEY.